United States Patent
Trentacosta et al.

(10) Patent No.: US 9,050,756 B2
(45) Date of Patent: Jun. 9, 2015

(54) METHOD OF MAKING A HELMET

(75) Inventors: Joseph D Trentacosta, Wilmington, DE (US); William Charles Walker, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 107 days.

(21) Appl. No.: 13/978,153

(22) PCT Filed: Jan. 13, 2012

(86) PCT No.: PCT/US2012/021242
§ 371 (c)(1),
(2), (4) Date: Jul. 3, 2013

(87) PCT Pub. No.: WO2012/097252
PCT Pub. Date: Jul. 19, 2012

(65) Prior Publication Data
US 2013/0283578 A1    Oct. 31, 2013

Related U.S. Application Data

(60) Provisional application No. 61/432,230, filed on Jan. 13, 2011.

(51) Int. Cl.
*G06F 19/00* (2011.01)
*B29C 65/72* (2006.01)
*A42C 2/00* (2006.01)
*A42B 3/00* (2006.01)

(52) U.S. Cl.
CPC ............. *B29C 65/72* (2013.01); *A42C 2/005* (2013.01); *A42B 3/00* (2013.01)

(58) Field of Classification Search
CPC .......... A42C 2/00; A42C 2/002; A42C 2/005; A42C 2/007; A42B 3/00; B29C 65/72
USPC .................................................. 700/130–133
See application file for complete search history.

(56) References Cited

U.S. PATENT DOCUMENTS

| | | | |
|---|---|---|---|
| 4,199,388 A | 4/1980 | Tracy et al. | |
| 4,656,674 A | 4/1987 | Medwell | |
| 5,565,155 A | 10/1996 | Cheng-Hung | |
| 6,029,269 A * | 2/2000 | El-Soudani | 2/2.5 |
| 7,228,571 B2 | 6/2007 | Cheese | |
| 2005/0125881 A1 | 6/2005 | Cheese | |
| 2012/0175046 A1 * | 7/2012 | Jones et al. | 156/189 |

FOREIGN PATENT DOCUMENTS

| | | |
|---|---|---|
| EP | 1836913 A2 | 9/2007 |
| KR | 1020050076879 A | 7/2005 |

OTHER PUBLICATIONS

International Search Report dated Sep. 3, 2012, International Application No. PCT/US2012/021242.

* cited by examiner

*Primary Examiner* — Nathan Durham

(57) ABSTRACT

This invention relates to a method of making a helmet using a preform subassembly with arms which have an area that matches a perimeter profile of a specified geometric shape. By use of the area matching perform with arms, the thickness of the helmet is more uniform, seams in the preform can be minimized, and the ballistic resistance of the resulting helmet can be increased.

12 Claims, 2 Drawing Sheets

METHOD OF MAKING A HELMET

This application claims priority under 35 U.S.C. §119(e) from, and claims the benefit of, U.S. Provisional Application No. 61/432,230, filed 13 Jan. 2011, which is by this reference incorporated in its entirety as a part hereof for all purposes.

TECHNICAL FIELD

This invention relates to a method of making a helmet preform subassembly, and making a helmet using a preform derived therefrom.

BACKGROUND

Current helmet manufacturing techniques involve using flat sheets of fabric from which a three-dimensional shape is formed. Numerous plies of the fabric, or preforms, are compressed together in a matched die mold that corresponds to the desired three-dimensional shape of the helmet. To try to achieve uniform thickness in a molded article that has a rounded shape, it is often necessary to introduce numerous cuts, darts, folds, wrinkles or irregularly-shaped patches into what would otherwise be a flat piece of fabric. This reduces ballistic resistance in the product helmet.

Other efforts to manufacture a helmet have involved rotating regions that are overlapped, as the assembly of preforms is built up with each additional ply of fabric, in order to distribute the extra thickness of the overlapped regions evenly about the preform assembly and theoretically achieve uniform thickness in the final molded product. This approach is sometimes capable of achieving a near-net-shape preform assembly, which has relatively good conformability to the final helmet shape with minimal wrinkling, but not at a desirable level of efficiency and consistency.

Cheese (U.S. Pat. No. 7,228,571) discloses a helmet manufactured by cutting rectangular blanks from a sheet of fabric and making cuts in each blank to form a crown portion. The blanks are stacked and molded to form the helmet. Each blank has four curved cuts extending inwardly, one from each side of the rectangle. Portions of the preform overlap other portions around the cuts.

Medwell (U.S. Pat. No. 4,656,674) discloses a helmet manufactured by cutting a preform along a zig-zag line so that each part has one straight edge and one edge with a series of teeth. The cut length is wound in several layers around a cylindrical former, so that the teeth of successive layers are alternating. The layers are then compressed to bend over the teeth and give a rigid preform.

A need nevertheless remains for methods for making a helmet in which the thickness of the helmet is more uniform, in which seams in the preform are minimized, and in which the ballistic resistance of resulting helmet is increased.

SUMMARY

It has been found that the presence of a wrinkle or any cut end in a preform assembly, despite having been made form a high performance yarn, has a negative effect on the ballistic resistance of a structure molded therefrom. For example, wrinkling in a molded structure could cause not only an increase in weight of as much as 9% due to the additional material incorporated into the structure, but could also cause a drop in the $V_{50}$ performance of the structure of as much as 5%. In another example, in a helmet using a system of 100% Kevlar® aramid fiber, the ballistic limit, or $V_{50}$, of a helmet made by conventional technology can have weak areas that contribute to a 10% lower $V_{50}$ at seams or cuts in the helmet pattern.

To improve helmet products made by conventional technology, which are frequently characterized by
  weak areas where fabric cuts or seams exist;
  non-uniformity in thickness due to overlapped and non-overlapped regions in the fabric; and/or
  wrinkling due to excess fabric in the preform, there is provided herein a method of determining the shape and size of a preform subassembly for a helmet;
wherein the helmet is characterized by a hemispherical shape, and the hemispherical shape has a center point and central axis that passes through the center point; and
wherein the preform subassembly shape comprises m arms arranged about a center point, each arm has at least one width ($W^i$), and m=3 or 4; comprising (a) providing a series of n reference planes ($P^1, P^2, P^3 \ldots P^n$) that is each orthogonal to the central axis and describes a circular shape at the location of its intersection with the hemispherical shape;

(b) measuring, for each reference plane, (1) the perimeter length (referred to as $H^i$ for $P^i$) of the circular shape, and (2) the length defined by the distance along the hemispherical shape of the arc (referred to as $A^i$ for $P^i$) that exists between the location of the intersection of the plane therewith and the center point, wherein for a subassembly in which $P^1$ is the closest plane to the center point $A^1 < A^2 < A^3 < \ldots < A^n$, and $H^1 < H^2 < H^3 < \ldots < H^n$;

(c) providing a series of n concentric reference circles ($C^1, C^2, C^3 \ldots C^n$) each of which has the same center point, wherein the radius of circle $C^i$ is arc length $A^i$;

(d) dividing perimeter lengths $H^1, H^2, H^3 \ldots H^n$ into m equal portions, and assigning one of the equal portions as an equally-spaced segment ($W^1, W^2, W^3 \ldots W^n$) of each of the respective reference circles $C^1, C^2, C^3 \ldots C^n$;

(e) drawing a line to connect the end points of the segments of circle length ($W^1, W^2, W^3 \ldots W^n$) to graphically represent the m arms of the preform subassembly.

In another embodiment, the inventions hereof provide a method of determining the shape of a preform subassembly for a helmet wherein the helmet is characterized by a hemispherical shape, and the hemispherical shape has a center point and central axis that passes through the center point; and
wherein the preform shape comprises m arms arranged about a center point, each arm has a width (W), and m≥2; comprising (a) providing a series of n reference planes ($P^1, P^2, P^3 \ldots P^n$) that is each orthogonal to the central axis and describes a circular shape at the location of its intersection with the hemispherical shape;

(b) measuring, for each reference plane, (1) the perimeter length of the circular shape (referred to as $H^i$ for $P^i$), and (2) the length defined by the distance along the hemispherical shape of the arc that exists between the location of the intersection of the plane therewith and the center point (referred to as $A^i$ for $P^i$), wherein $A^1 < A^2 < A^3 < \ldots < A^n$, and $H^1 < H^2 < H^3 < \ldots < H^n$;

(c) providing a series of n reference circles ($C^1, C^2, C^3 \ldots C^n$) each of which has its center at the center point of the preform shape, wherein the radius of $C^i$ is $A^i$;

(d) dividing $H^1, H^2, H^3 \ldots H^n$ into m equal portions, and assigning one of the equal portions as the width ($W^1, W^2, W^3 \ldots W^n$) of one of the m arms of the perform shape lying at a distance of A from the center point of the preform shape, wherein $H^i/m$ gives m portions having a width of $W^i$ lying a distance of $A^i$ away from the center point; and (e) drawing a line to connect the end points of the segments of width ($W^1$, $W^2$, $W^3$ ... $W^n$) in each arm to graphically represent the shape of the perform sub-assembly.

The inventions hereof relate to methods to make a helmet preform subassembly with arms that have an area matching the area of a perimeter profile of a specified three-dimensional shape, and ultimately to make a helmet using such subassembly. By the use of an area-matching preform subassembly, such as a 3-armed or cruciform (4-armed) preform shape, the thickness of a helmet fabricated therefrom is more uniform. Seams in a three-armed or four-armed preform subassembly can be minimized, and the ballistic resistance of a helmet fabricated therefrom can be increased. The methods hereof also reduce waste and produce a stronger helmet.

DETAILED DESCRIPTION

Figure 1:
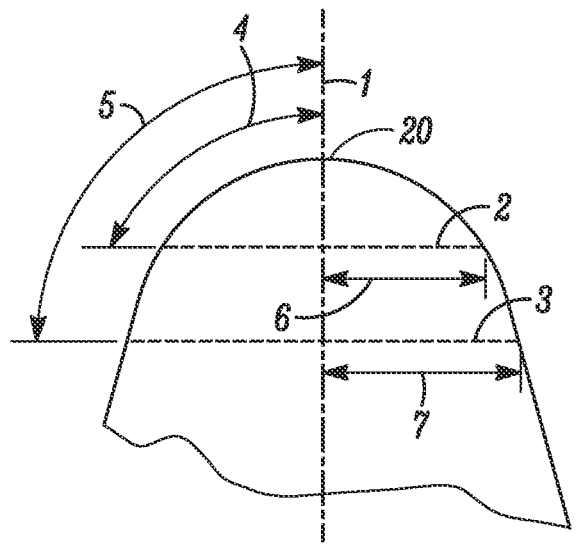
FIG. 1 shows the a profile of a helmet of interest in a vies of the side elevation thereof.

There is thus described herein methods that provide a "stitched" helmet preform. The virtue of a stitched helmet preform is that it involves a single component approach wherein a flat piece of fabric is converted into a near-net-shape preform subassembly, and the desired number of preform subassemblies can in turn be stacked into a full preform assembly that is ready to be placed into a matched die helmet mold. The approach that the "stitched" helmet preform provides is a technology that can be applied across the range of prepreg materials used in helmet manufacturing, including laminated, woven or unidirectional fabrics.

In various embodiments of the methods hereof, elements of those methods that are provided include (1) using the length of a perimeter profile of a helmet shape of interest to match the area of the exterior surface of the helmet to the area of a 3- or 4-armed shape that serves as a preform sub-assembly, (2) obtaining uniform thickness in a helmet preform and in a helmet by eliminating overlapping regions, and (3) mitigating the effects of cuts or seam in a preform by stitching that enhances rather that detracts from penetration resistance.

The shape of a "stitched" helmet preform, as provided herein, is designed to match the perimeter profile of the three-dimensional shape of a helmet of interest closely enough that there is no excess material in the preform subassemblies to cause wrinkling. There are only three cuts in a 3-armed subassembly, and there are a maximum of four cuts in a cruciform (4-armed) preform subassembly, which allows the arms of the cruciform shape cut from flat fabric to be stitched together to provide a subassembly of shape and size that corresponds closely to the shape and size of a helmet of interest. The edges of the preform subassembly are butt-stitched together so that there are no overlapping regions and therefore the subassembly provides uniform thickness throughout the structure in the preform assembly and molded structure. The presence of cuts or seams is mitigated by stitching the adjacent arms together to minimize any overlap of fabric and thereby reduce any areas that are inherently weak. The effect on ballistic performance of the presence of seams is greatly reduced by having reduced the number of seams or cuts from as many as eight to just three or four. The effect of the seam is reduced because the seams are stitched together in a manner that reduces or eliminates overlap, which enhances rather than reduces ballistic resistance.

The methods hereof provide for the determination of the shape and size of a preform subassembly for the manufacture of a helmet, wherein the helmet is characterized by a hemispherical shape. A hemispherical shape is a shape that is nearly but not precisely the shape of a true hemisphere. A hemispherical shape may have locations of slight curvature and/or inflection that cause it to deviate from the shape of a true hemisphere and to take on a shape that is somewhat characteristic of one half of an oblate spheroid.

A cross-sectional view of a side elevation of a helmet of interest is shown in FIG. 1, and this helmet would be described as having a hemispherical shape. As shown in FIG. 1, the hemispherical shape has a center point 20 located at the apex of the area defined by the shape as shown in the cross-sectional view, and a central axis 1 that intersects the exterior surface of the helmet at the location of the center point. The top of the helmet would be described as the portion thereof at or near the center point 20, and the bottom of the helmet would be described as the open portion through the wearer places the helmet on his or her head.

To prepare a subassembly for a helmet of interest, the dimensions and the paths of the various arcs defined by the exterior surface of the shape of the helmet are obtained from either a physical model of the helmet, or from engineering drawings of various cross-sectional views of the profile defined by the exterior surface of a side elevation of the helmet, and/or from a plan view of the perimeter defined by the external surface of the top of the helmet. This data can be entered into a computer assisted design ("CAD") program, which enables the program to generate a three-dimensional model of the helmet and to calculate the arc and perimeter distances discussed below. Alternatively, those measurements can be made by hand on a physical model of the helmet.

The first step in a method of designing a preform subassembly, and thus a method of determining the shape and size of the preform subassembly, for a helmet of interest, is to provide a series of n reference planes ($P^1$, $P^2$, $P^3$ ... $P^n$) that is each orthogonal to the central axis 1. A reference plane 2 and a reference plane 3 are shown in FIG. 1. There will be at least two such reference planes, and n will thus be ≥2, but there is otherwise no required number of reference planes. In various embodiments, the number of reference planes can, for example, be at least 2, or at least 4, or at least 6, or at least 8, and yet less than 60, or less than 40, or less than 30, or less than 20. In various embodiments, the reference plane that lies closest to the center point 20 can define a distance between the two points of intersection of the plane with the exterior surface of the helmet that is in the range of about 0.2 inches or more, or about 0.4 inches or more, or about 0.6 inches or more, or about 0.8 inches or more, or about 1.0 inches or more, and yet about 4.0 inches or less, or about 3.0 inches or less, or about 2.5 inches or less, or about 2.0 inches or less, or about 1.5 inches or less.

Reference planes can, but need not necessarily, be spaced equidistant from each other. When the reference planes are equidistant from each other, the spacing distance can be measured along the central axis 1, or the spacing distance can be measured in terms of the arc length along the profile defined by the exterior surface of the helmet in a cross sectional view of the side elevation thereof. Spacing distances for reference planes can, for example, be selected from the following group of selections including 0.05 inch, 0.1 inch, 0.15 inch, 0.2 inch, 0.25 inch, 0.3 inch, 0.35 inch, 0.4 inch, 0.45 inch and 0.5 inch, and mixtures thereof.

Figure 2:
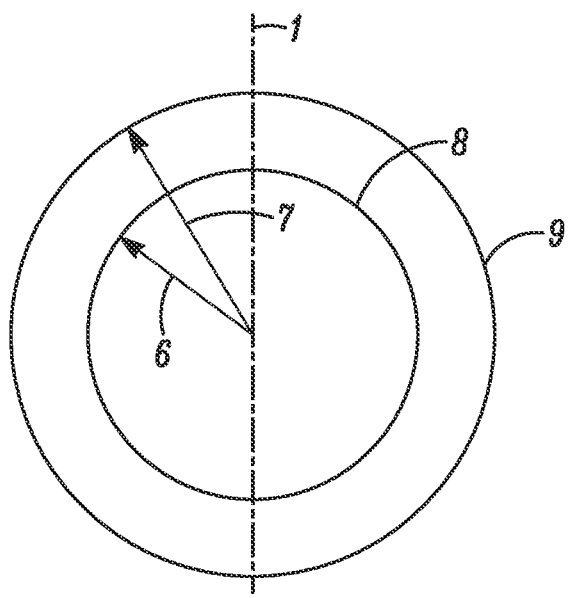
FIG. 2 shows a plan view of a helmet shape.

Because a helmet has a hemispherical shape, which is not the shape of a true hemisphere, the intersection of a reference plane with the shape of the exterior surface of the helmet describes a shape that can be described as nearly circular. A nearly circular shape is a shape that does not form a true circle, but that deviates from the shape of a true circle primarily because of, and at the locations of, points of slight curvature and/or inflection in the shape of the exterior surface of the helmet itself. As a result, the shape formed by the intersection of a reference plane with the shape of a helmet of interest can, for example, take on a shape approximating an elliptical shape. The shape formed by the intersection of a reference plane with the shape of the helmet is the perimeter of the helmet at the location of that particular reference plane. FIG. 2 is a plan view of the helmet looking down on the top of the helmet. Nearly circular shape 8 represents the perimeter defined by the intersection of reference plane 2 with the profile of the exterior surface of the helmet, and nearly circular shape 9 represents the perimeter defined by the intersection of reference plane 3 with the profile of the exterior surface of the helmet.

For each reference plane, the length of the nearly-circular-shaped perimeter of the helmet existing at that location is measured. The length or linear distance of the perimeter of the helmet at reference plane $P^i$ is referred to as $H^i$. For each reference plane, the linear distance of an arc formed by the exterior surface of the helmet between the center point 20 and a point of intersection of the reference plane with the exterior surface is also measured. As shown in FIG. 1, for reference plane 2, arc 4 is described by the intersection of the plane with the exterior surface of the helmet. For reference plane 3, arc 5 is described by such intersection. The linear distance of an arc formed by the exterior surface of the helmet between the center point 20 and a point of intersection of reference plane $P^i$ with the exterior surface is referred to as $A^i$. For the type of helmet shown in FIG. 1, which has a shape that flares toward the bottom and in which each perimeter increases in size moving from the top of the helmet toward the bottom, it is typically the case that $H^1 < H^2 < H^3 < \ldots < H^n$, and $A^1 < A^2 < A^3 < \ldots < A^n$.

Figure 3:
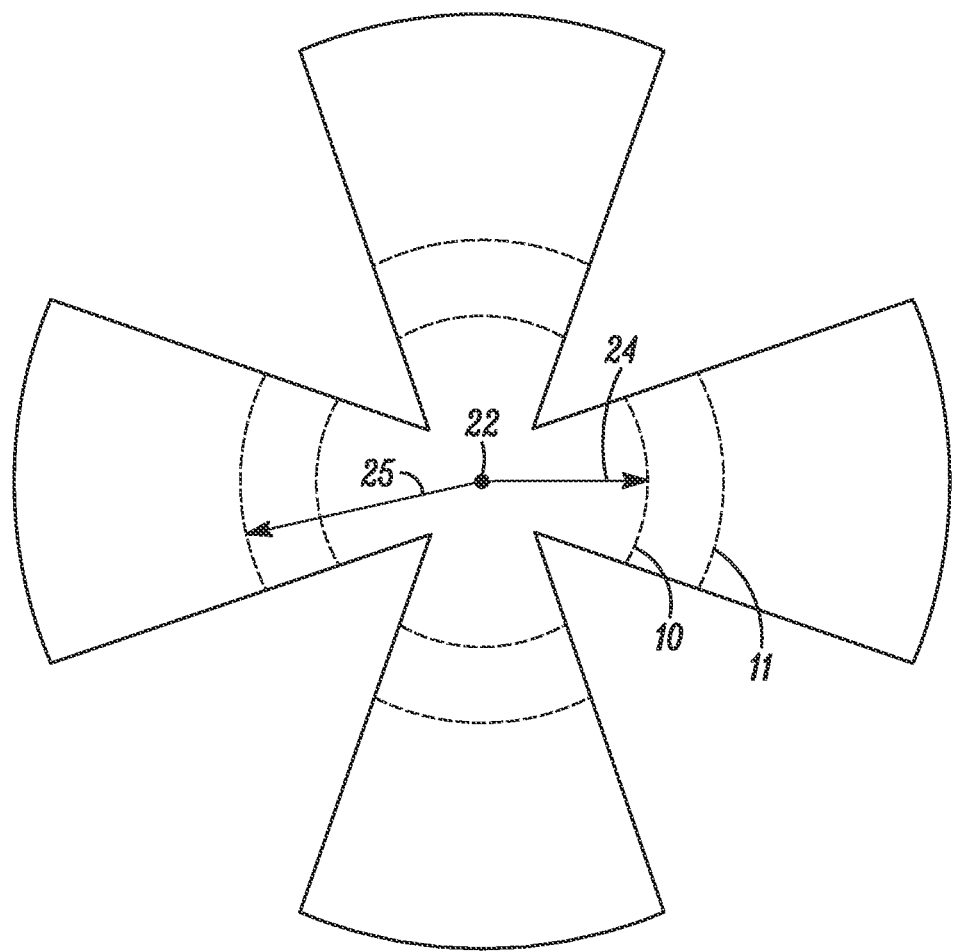
FIG. 3 shows a four-armed preform subassembly.

Having determined the measurements of the values $H^1$, $H^2$, $H^3$, ... $H^n$, and $A^1$, $A^2$, $A^3$, ... $A^n$, a diagram is constructed that contains a series of n concentric reference circles that each has the same center point 22, as shown in FIG. 3. A reference circle ($C^i$) is provided for each set of $H^i/A^i$ values obtained by making the measurements of linear distance described above. A series of n reference circles ($C^1$, $C^2$, $C^3$ ... $C^n$) is thus provided for the series of values sets $H^1/A^1$, $H^2/A^2$, $H^3/A^3$, ... $H^n/A^n$.

For the $H^i/A^i$ value set, a circle is drawn that has a a radius of $A^i$ from the center point 22 of the circle. Around that circle, the linear distance $H^i$ is (for a 4-armed subassembly) apportioned in four equal parts that are equally spaced from one another. In FIG. 3, for example, reference circle 10 has a radius 24 equal to the length of the arc 4 between the center line of the helmet 1 and the point of intersection of reference plane 2 with the profile of the exterior surface of the helmet. Around reference circle 10, the linear distance equal to the length of the perimeter defined by the intersection of reference plane 2 with the exterior surface of the helmet (represented by nearly circular shape 8) has been apportioned in four equal, equally spaced parts (shown by dashed lines in FIG. 3). Similarly, reference circle 11 in FIG. 3 has a radius 25 equal to the length of the arc 5 between the center line of the helmet 1 and the point of intersection of reference plane 3 with the profile of the exterior surface of the helmet. Around reference circle 11, the linear distance equal to the length of the perimeter defined by the intersection of reference plane 3 with the exterior surface of the helmet (represented by nearly circular shape 9) has been apportioned in four equal, equally spaced parts.

The same procedure is followed for each other perimeter that has been generated by the intersection of a reference plane with the profile of the exterior surface of toe helmet as shown in a view of the side elevation thereof. Thus reference circle $C^i$ is drawn around center point 22 that has a radius of $A^i$, and the length ($H^i$) of the perimeter generated by the intersection of plane $P^i$ with the helmet is apportioned in four equal, equally spaced parts ($W^i$) around the circle $C^i$. This continues until a series of n reference circles ($C^1$, $C^2$, $C^3$ ... $C^n$), containing therewithin four equal portions of perimeter length, has been drawn for the series of values sets $H^1/A^1$, $H^2/A^2$, $H^3/A^3$, ... $H^n/A^n$. In FIG. 3, for example, the four Ws provided by apportioning the perimeter distance generated by the intersection of reference plane 2 with the helmet are shown as the four dashed-line segments of reference circle 10. Similarly, the four Ws provided by apportioning the perimeter distance generated by the intersection of reference plane 3 with the helmet are shown as the four dashed-line segments of reference circle 11. Thus a series of these one-fourth perimeter length segments of reference circle is provided for each reference circle, with the result that a series of the one-fourth equal lengths ($W^1$, $W^2$, $W^3$ ... $W^n$) is provided for the full series of values sets $H^1/A^1$, $H^2/A^2$, $H^3/A^3$, ... $H^n/A^n$.

When the ends of these segments of the reference circles that each represents one-fourth of a perimeter length ($H^i$) are connected by a straight line, the arms of a cruciform shaped pattern for a preform subassembly are provided, with the end of each arm of the cruciform being provided along the track of the reference circle further from the center point 22. The arms of the subassembly are joined to the area around the center point 22 by the track of the reference circle closest, to center point 1. The longest distance from the center point 22 of a preform subassembly to a point on the exterior end of an arm can, in various embodiments, be between about 5 and about 20 inches.

If it desired to have a preform subassembly with three arms rather than four, the same procedure as described above is followed except that the perimeter distance $H^i$ is divided into three equal segments that are equally spaced around corresponding reference circle, and Wi is thus one-third of $H^i$ rather than one fourth. In either case, the graphical representation of the preform subassembly obtained by connecting the end points of the Wi segments with a straight line can be used to prepare a pattern from which a preform subassembly can be cut from a flat sheet of ballistic resistant fabric. When the adjacent edges of the arms of the preform subassembly are butt stitched together, the preform subassembly is provided in a shape that quite closely matches the shape of the helmet, of interest with a minimum, if any, of wrinkles, folds or darts. This is possible because the preform subassembly has been cut wholly from just one piece of fabric.

A further embodiment of this invention is a method to fabricate a helmet. The first step in such a fabrication or manufacturing method is providing a plurality of helmet preform subassemblies designed by the methods described above. The preform comprises at least two of the preform subassemblies nested together wherein the fabric of the preform subassemblies is impregnated with a polymer resin. Adjacent arms of the preform subassembly are stitched together at the side edges of the arms to form a stitched preform. Next, the stitched preform subassemblies are stacked to provide a preform, and the preform is compression molded.

The fabric of the preform subassembly may be made of high performance fibers having a tenacity greater than about 8 g/den such as para-aramid (e.g. DuPont Kevlar® fiber), ultra high molecular weight polyethylene (UHMWPE), high tenacity nylon, carbon fiber, or p-phenyl-2-6-benzobisoxazole (PBO) fibers. Fabrics made from such fibers can, as desired, be made as plain, twill, harness or satin weave. The impregnating polymer resin may be a thermoplastic or thermoset polymer such as a urethane or functionalized ethylene copolymer. Once the shape of the preform subassembly has been matched to the helmet design, preform subassemblies may be cut from larger sheets of fabric by conventional means such as scissors or knives.

The adjacent side edges of a preform subassembly may be butt stitched together such that there is essentially no overlap of the side edges of the subassembly arms. The stitching of side edges of the arms that are adjacent to each other may have a density between about 5 ends per inch to about 20 ends per inch. The thread used for stitching may be made of high performance fibers having a tenacity greater than about 8 g/den such as fibers made from carbon, para-armid, fiberglass, ultra high molecular weight polyethylene and PBO.

The adherence together of the side edges of the adjacent arms of the subassembly may also be accomplished by adhesively bonding a unidirectional (UD) tape to each edge of the adjacent arms such that there is essentially no overlap of the adjacent side edges. The unidirectional UD tape may be made of high performance fibers having a tenacity greater than about 8 g/den such as fibers made from para-aramid (e.g. DuPont Kevlar® fiber), ultra high molecular weight polyethylene (UHMWPE), high tenacity nylon, carbon, or p-phenyl-2-6-benzobisoxazole (PBO).

A stack of preforms to be compression molded may have 10 to 75, or 40 to 50, stitched preforms. The number of preforms that are compressed together will be determined by the basis weight of the ultimate helmet product which is often in the range of about 1.8 to about 2.2 lbs/square foot. The compression molding may be conducted at a temperature between about 120° C. to about 180° C. using between about 200 to about 500 tons of force.

EXAMPLES

The operation and effects of certain embodiments of the inventions hereof may be more fully appreciated from a series of examples (Examples 1 and 2), as described below. The embodiments on which these examples are based are representative only, and the selection of those embodiments to illustrate the inventions does not indicate that materials, designs, conditions, techniques or protocols not described in the examples are not suitable for use herein, or that subject matter not described in the examples is excluded from toe scope of the appended claims and equivalents thereof. The significance of the examples is better understood by comparing the results obtained therefrom with the results obtained from certain trials that are designed to serve as controlled experiments (Controls A and B) and provide a basis for such comparison since the distinguishing features of the inventions hereof were not used therein.

A cruciform design for a single component (single piece) preform was developed. By empirically varying the parameters of the design, it was possible to match the perimeter profile of the exterior of a simplified hemispherical helmet. Table 1 gives the dimensions of the arms of the subassembly as prepared in Control B and Example 1 for a hemispherical shaped helmet where the diameter of the corresponding true hemisphere equals 10", which models a size medium helmet. In Table I, A1, A2, A3 and A4 are the distances from the center point, of the subassembly to the edge of four reference circles (i.e. the radii of the respective circles) in a layout of a subassembly that corresponds to the subassembly shown in FIG. 3. For example, A1 and A2 could be considered to correspond to radii 24 and 25 in FIG. 3, and A3 and A4 would correspond to the respective radii of reference circles not shown in FIG. 3. The widths of the preform arms are listed in Table 1 as W1, W2, W3 and W4, and those widths correspond, respectively, to segments of the reference circles determined by the respective radii A1, A2, A3 and A4. W1 and W2 could be considered to correspond to the dashed-line segments of reference circles 10 and 11, respectively, as shown in FIG. 3. W3 and W4 would correspond to the dashed-line segments of reference circles not shown in FIG. 3. The dimensions in Table 1 are given in inches.

Control A

In Control A, a lightweight [1.6-1.8 pounds per square foot aerial density (where the aerial density given in Table II is the weight per unit area of the preform given in pounds per square foot)] Personnel Armor System for Ground Troops (PASGT) style helmet was molded from 42 plies (or layers of fabric, counted in ply count) of 5.1 ounces per square yard, 29 ends×29 ends, plain weave fabric (Style 751, JPS Inc., Spartanburg S.C.) made with 600 denier Kevlar® KM2 fiber. Each ply or layer of fabric was coated with a film of a thermoplastic polymer (Mark VI, DuPont, Wilmington Del.) such that the resin content level was greater than 10 wt % but less than 20 wt %. The preform was a multiple component preform consisting of a 21" diameter circle with 7.5" cuts at 0, 90, 180 & 360 degrees, and a four legged cross where the width of each leg was 4.25", and the length of each leg was 10.5" from the center point. By overlapping the circle in the cut areas, the circle-cross preform was formed into a bucket shape such that the wall thickness in all areas was 2 plies thick. This technique was repeated for each circle-cross pair until 21 preform buckets were nested together.

The subassembly of preform buckets was placed into a matched die PASGT helmet mold with a 0.080" metal shim, and processed at a molding temperature of 160° C. and a molding pressure of 200 tons total force for 13 minutes. The material was cooled to below 70° C. while being held at mold pressure. The molded helmet was removed from the matched die helmet mold and the excess material removed. The molded weight of the helmet is given in pounds in Table II. The helmet was ballistically tested to determine its $V_{50}$ in terms of a 17 grain fragment simulated projectile (fsp) (listed as the Threat in Table II). $V_{50}$ is the strike velocity of the projectile at which 50% of the projectiles at that velocity will be stopped, and 50% will completely penetrate the helmet. The $V_{50}$ value is shown in Table II below in feet per second. Control A is made by conventional technology in which portions of the same or adjacent plies are overlapped, and is thus not made by any of the methods of this invention.

Control B

In Control B, a lightweight (1.6-1.8 pounds per square foot aerial density) PASGT style helmet was molded from 42 plies of 5.1 ounces per square yard, 29×29 plain weave, fabric made with 600 denier Kevlar® KM2 fiber. Each ply or layer of fabric was coated with a film of a thermoplastic polymer such that the resin content level was greater than 10 wt % but less than 20 wt %. Each ply was cut into a single component cruciform shaped preform subassembly where the width of each spoke of the cruciform is shown in Table I below. The four arms of each subassembly were stitched together such that there was no overlap at the seams. The stitched subassemblies were nested together into a moldable preform. Although the preform of Control B was fabricated using a four arm preform subassembly, the widths of the subassembly arms were not determined by equal apportionment of the linear distance of a perimeter generated by the intersection of a reference plane with the profile of the desires helmet shape, that is those dimensions were not determined by the methods of this invention as described above.

The preform of stitched subassemblies was placed into a matched die PASGT helmet mold with a 0.080" metal shim, and processed at a molding temperature of 160° C. and a molding pressure of 200 tons total force for 13 minutes. The material was cooled to below 70° C. while being held at mold pressure. The molded helmet was removed from the matched die helmet mold, and the excess material removed. The helmet was tested to determine its ballistic limit for a 17 grain fsp, and its value is shown in Table II below.

Example 1

In Example 1, an example of the invention, a lightweight (1.6-1.8 pounds per square foot aerial density) PASGT style helmet was molded from 42 plies of 5.1 ounces per square yard, 29×29 plain weave, fabric made with 600 denier Kevlar® KM2 yarn. Each ply or layer of fabric was coated with a film of a thermoplastic polymer such that the resin content level was greater than 10% but less than 20%. Each ply was cut into a single component cruciform shaped preform where the width of each spoke or arm of the cruciform matched the perimeter profile of the hemispherical shape that approximated a medium size PASGT helmet. The dimensions of the preform are shown in Table I below. The arms of each preform were stitched together such that there was no overlap at the seam. The stitched preforms were nested together into a subassembly.

The subassembly of stitched preforms were placed into a matched die PASGT helmet mold with a 0.080" metal shim, and processed at a molding temperature of 160 C and a molding pressure of 200 tons total force for 13 minutes. The material was cooled to below 70 C while being held at mold pressure. The molded helmet was removed from the matched die helmet mold, and the excess material removed. The helmet was tested to determine its ballistic limit for a 17 grain fsp, and its value is shown in Table II below. Example 1, made by a method of this invention, exhibits the highest ballistic limit observed.

TABLE I

Dimensions of Control B and Example 1 Preform Designs.

| Control or Example ID | $A_1$ r (in.) | $A_2$ r (in.) | $A_3$ r (in.) | $A_4$ r (in.) | $W_1$ (in.) | $W_2$ (in.) | $W_3$ (in.) | $W_4$ (in.) |
|---|---|---|---|---|---|---|---|---|
| B | 1.5 | 2.3 | 3.0 | 10.5 | 1.5 | 2.8 | 6.0 | 9.4 |
| 1 | 3.0 | 4.3 | 5.5 | 10.5 | 3.0 | 5.5 | 8.0 | 9.3 |

TABLE II

Ballistic Limits (V50 values) of Controls A and B and Example 1

| Control or Example ID | Preform | | | Analysis | | | |
|---|---|---|---|---|---|---|---|
| | Kevlar Mat'l | Resin Mat'l | Ply Count | Molded Weight | Aerial Density | Thickness | Threat | $V_{50}$ |
| A | 751 | Mark IV | 42 | 2.054 | 1.729 | 0.2646 | 17 | 2245 |
| B | 751 | Mark IV | 42 | 2.276 | 1.916 | 0.2853 | 17 | 2268 |
| 1 | 751 | Mark IV | 42 | 2.118 | 1.783 | 0.2697 | 17 | 2503 |

Example 2

In a flat panel study, it was shown that butt stitching a seam with a zig-zag or satin stitch with a high performance fiber thread can provide equivalent ballistic performance in a flat panel of uncut fabric plies.

Panels A & F were twelve inch square molded flat panels each consisting of 21 plies of 12"×12" 600 denier KM2 S751 woven fabric coated with a thermoplastic resin containing polyethylene and Kraton® styrene/ethylene-butadiene/styrene copolymer (designated as Mark IV). The plies were heated to 320° F. under pressure for 10 minutes and cooled under pressure to below 100° F. These panels, A & F were the flat panel controls to provide the ballistic limit that would provide the target for the stitched panels.

Panels B, C, D, and E were twelve inch square molded flat panels consisting of 21 plies of the same material system butt stitched together with stitching as specified in Table III. Each panel had seven plies that consisted of three sections, 4" wide by 12" long, that were butt stitched along the 12" side so that the stitched ply was 12"×12". Each panel also had seven plies that consisted of one section 3" wide by 12" long, and a second section that was 4" wide by 12" long, and a third section that was 5" wide by 12" long. The three sections were butt stitched along the 12" side so that the stitched ply was 12"×12". Each panel also had seven plies that consisted of one section 5" wide by 12" long, and a second section that was 4" wide by 12" long, and a third section that was 3" wide by 12" long. The three sections were butt stitched along the 12" side so that the stitched ply was 12"×12". The stitched plies were assembled by alternating each ply so that the stitched seams did not align with the underlying ply.

The six panels were ballistically tested to determine the ballistic limit for each configuration and is shown in Table III. Panel C, with its stitching arrangement, showed that its ballistic limit was statistically equivalent to the unstitched controls of the same material system, and basis weight.

TABLE III

Stitched Flat Panel Study

| Panel ID | Stitches Per inch | Stitch Width | Temp. F. | Pressure Tons | Weight (psf) | Thick. in | V50 ft/sec |
|---|---|---|---|---|---|---|---|
| A | 0 | 0 | 320 | 144 | 1.620 | 0.2462 | 2479 |
| B | 10 | 0.375 | 320 | 144 | 1.638 | 0.2376 | 2406 |
| C | 10 | 0.25 | 320 | 36 | 1.626 | 0.2522 | 2493 |
| D | 16 | 0.375 | 320 | 36 | 1.636 | 0.2618 | 2443 |
| E | 20 | 0.375 | 320 | 36 | 1.638 | 0.2641 | 2312 |
| F | 0 | 0 | 320 | 144 | 1.620 | 0.2487 | 2513 |

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

What is claimed is:

1. A method of fabricating a helmet characterized by a hemispherical shape, the hemispherical shape having a center point and a central axis that passes through the center point, the method comprising:

(a) providing a helmet preform subassembly comprising at least two layers of fabric wherein the at least two layers of fabric are impregnated with a polymer resin, the helmet preform subassembly having a shape comprising m arms arranged about the center point, each arm having at least one width $W^i$, and m=3 or 4, wherein the shape and size of the preform subassembly is determined by:

(i) providing a series of n reference planes $P^1, P^2, P^3 \ldots P^n$ that is each orthogonal to the central axis and describes a circular shape at the location of its intersection with the hemispherical shape;

(ii) measuring, for each reference plane, (1) the perimeter length referred to as $H^i$ for $P^i$ of the circular shape, and (2) the length defined by the distance along the hemispherical shape of the arc referred to as $A^i$ for $P^i$ that exists between the location of the intersection of the plane therewith and the center point, wherein for a subassembly in which $P^1$ is the closest plane to the center point $A^1 < A^2 < A^3 < \ldots < A^n$, and $H^1 < H^2 < H^3 < \ldots < H^n$;

(iii) providing a series of n concentric reference circles $C^1, C^2, C^3 \ldots C^n$ each of which has the same center point, wherein the radius of circle $C^i$ is arc length $A^i$;

(iv) dividing perimeter lengths $H^1, H^2, H^3 \ldots H^n$ into m equal portions, and assigning one of the equal portions as an equally-spaced segment $W^1, W^2, W^3 \ldots W^n$ of or each of the respective reference circles $C^1, C^2, C^3 \ldots C^n$;

(v) drawing a line to connect the end points of the segments of circle length $W^1, W^2, W^3 \ldots W^n$ to graphically represent the m arms of the preform subassembly;

(b) stitching together side edges of the arms of the perform subassembly which are adjacent to each other to form a stitched perform subassembly;

(c) stacking a plurality of stitched preform subassemblies to form a stack; and (d) compression molding the stack.

2. The method according to claim 1 wherein the fabric comprises a fiber prepared from para-aramid, ultra high molecular weight polyethylene, high tenacity nylon, carbon, or p-phenyl-2-6-benzobisoxazole.

3. The method according to claim 1 wherein the polymer resin is a thermoplastic or thermoset polymer.

4. The method according to claim 1 wherein the stitching together of adjacent side edges comprises butt stitching such that there is essentially no overlap of the side edges of the preform arms which are adjacent to each other.

5. The method according to claim 4 wherein the stitching together of side edges of the arms of the preform which are adjacent to each other comprises a step of adhesively bonding a unidirectional tape such that there is essentially no overlap of the adjacent side edges.

6. The method according to claim 5 where the unidirectional tape is made of high performance fibers having a tenacity greater than 8 g/den prepared from a material selected from para-aramid, ultra high molecular weight polyethylene, high tenacity nylon, carbon and p-phenyl-2-6-benzobisoxazole.

7. The method according to claim 1 wherein the stitching together of side edges of the preform arms which are adjacent to each other has a density between 5 ends per inch to 20 ends per inch.

8. The method according to claim 1 wherein the stack comprises between fifteen and seventy five stitched preforms.

9. The method according to claim 1 wherein the compression molding is conducted at a temperature between 120° C. to 180° C.

10. The method according to claim 1 wherein the compression molding is conducted at a pressure of between 200 to 500 tons of force.

11. The method according to claim 1 wherein the distance from the center to an exterior end of an arm along the central axis is between 5 and 20 inches.

12. The method according to claim 1 wherein the stitching together of side edges of the arms of the perform which are adjacent to each other is done with thread made of high performance fibers having a tenacity greater than 8 g/den prepared from a material selected from carbon, para-aramid, fiberglass, ultra high molecular weight polyethylene and p-phenyl-2-6-benzobisoxazole.

* * * * *